United States Patent [19]
Jeanne et al.

[11] Patent Number: 5,639,103
[45] Date of Patent: *Jun. 17, 1997

[54] FLAT GASKET, IN PARTICULAR FOR AN INTERNAL COMBUSTION ENGINE AND RELATED MANUFACTURING METHOD

[75] Inventors: Olivier Jeanne, Chamboret; Daniel Montresor, Nantiat; Georges Ulmer, Limoges, all of France

[73] Assignee: Meillor S.A., Nantiat, France

[*] Notice: The term of this patent shall not extend beyond the expiration date of Pat. No. 5,618,050.

[21] Appl. No.: 565,051

[22] PCT Filed: Sep. 14, 1992

[86] PCT No.: PCT/FR92/00861

§ 371 Date: May 5, 1994

§ 102(e) Date: May 5, 1994

[87] PCT Pub. No.: WO93/06392

PCT Pub. Date: Apr. 1, 1993

Related U.S. Application Data

[63] Continuation of Ser. No. 204,408, May 5, 1994, abandoned.

[30] Foreign Application Priority Data

Sep. 13, 1991 [FR] France .................. 91 11319
Feb. 25, 1992 [FR] France .................. 92 02171

[51] Int. Cl.⁶ .................................................. F16J 15/12
[52] U.S. Cl. .................. 277/235 B; 277/180; 277/231; 277/233
[58] Field of Search ............................. 277/231, 233, 277/235 B, 180, 227, 229, 232, 235 R, 235 A

[56] References Cited

U.S. PATENT DOCUMENTS

| | | | |
|---|---|---|---|
| 2,084,054 | 6/1937 | Balfe | 277/235 B |
| 4,234,638 | 11/1980 | Yamazoe et al. | 277/235 B |
| 4,776,602 | 10/1988 | Gallo | 277/235 B |
| 4,810,454 | 3/1989 | Belter | 277/235 B |
| 5,004,249 | 4/1991 | Grosch et al. | 277/235 B |

FOREIGN PATENT DOCUMENTS

| | | |
|---|---|---|
| 0693461 | 11/1930 | France . |
| 0787191 | 9/1935 | France . |
| 1 333 891 | 6/1962 | France . |
| 2 109 507 | 4/1979 | United Kingdom . |

Primary Examiner—Daniel G. DePumpo
Attorney, Agent, or Firm—Pollock, Vande Sande & Priddy

[57] ABSTRACT

A sheet gasket, particularly for internal combustion engines, consisting of at least one metal sheet forming a core which is cut to match the mating face, and elastomeric portions, particularly in bead form, which are bonded to the sheet around holes to be sealed. The gasket includes a single-piece elastomeric covering placed on part of the sheet surface to form localized sealing projections around the holes to be sealed. A related manufacturing method is also provided.

9 Claims, 3 Drawing Sheets

FLAT GASKET, IN PARTICULAR FOR AN INTERNAL COMBUSTION ENGINE AND RELATED MANUFACTURING METHOD

This application is a continuation of U.S. patent application Ser. No. 08/204,408, filed May 5, 1994 now abandoned.

FIELD OF THE INVENTION

The present invention relates to a flat gasket, in particular for an internal combustion engine, and to the related manufacturing method.

BACKGROUND OF THE INVENTION

Flat gaskets, in particular for a sump employed in internal combustion engines, must be capable both, of taking clamping loads and that of ensuring fluid-tightness.

For this purpose, the existing flat gaskets generally comprise a sheet of metal which permits taking loads and has a profile cut out to the shape of the joint plane.

The sheet is also provided with openings corresponding to the passage of clamping bolts and openings for the passage of the fluids.

On the periphery of the openings corresponding to the passage of fluids there is provided a beading of an elastomeric material which provides a seal.

A first important drawback of prior art gaskets is the poor connection of the elastomeric beading to the metallic sheet.

Indeed, the beading is molded and then secured by bonding solely on the inner surface of the opening. Since, the sheets employed have a thickness of a few tenths of a millimeter this surface is very small and, notwithstanding the fact that the bonding is considerable, the mechanical connection remains too weak to resist certain mechanical stresses, vibrations or shocks.

Moreover such gaskets provide a primary seal solely by means of the elastomeric beading.

There is no secondary seal which would complete this primary seal, so that any defect in the elastomeric beading results in leakage.

In an attempt to overcome this drawback, prior art gaskets have been provided in each of the openings with a projecting annular region which permits increasing the bonding area.

In certain cases, improvements involve radially notching the gaskets to still further increase the bonding area.

Nonetheless, such mechanical connection have been found insufficient for many applications since they provide no secondary seal and do not permit varying the distribution of the clamping loads.

Some gaskets of the prior art propose a stack of sheets coated with a thin layer of elastomer.

On the periphery of the openings to be sealed, the sheets are deformed so as to provide a boss.

In this case, the primary seal is ensured by the boss and the thin layer of elastomer while the secondary seal is ensured by the layer of elastomer spread over the joint plane.

For gaskets of this kind, the drawback concerns the elastomer, since it is selected from the nitriles family and thickness limited to be a few tenths of a millimeter and since a material is liable to crack at greater thicknesses.

Such a gasket thus only has a limited capacity to receive imprints since the elastomer does not have a good creep quality.

Consequently, the joint planes must have a very carefully prepared surface state, which correspondingly increases the cost and samplexity of manufacture.

There is also known from FR-A-1 333 891 a gasket which comprises a metallic core covered with a sealing material and which comprises extra thicknesses in the region of the openings to be sealed. This gasket has no means adapted to take loads well.

SUMMARY OF THE INVENTION

The present invention proposes a flat gasket, in particular for an internal combustion engine, comprising at least one metallic sheet forming a reinforcement cut out to the profile of the joint plane and elements of elastomer, in particular of the beading type, deposited and bonded on this sheet in the region of the openings to be sealed, comprises a sanitary packing of elastomer deposited on a part of the surface of the sheet while forming localized extra thicknesses for sealing in the region of the openings to be sealed with at least one sheet provided with distributed resilient bearing elements on at least one of the faces of the sheet.

According to another characteristic of the invention, the distributed resilient bearing elements comprise resilient deformations provided in the sheet or sheets which project from each side of the sheet or each of the sheets.

Further, the resilient deformations provided in the sheet or sheets are symmetrical relative to the median plane of the sheet or each of the sheets.

According to a particular characteristic of the invention, the reinforcement comprises a stack of superposed sheets, one of the sheets being a smooth sheet devoid of a resilient bearing element and performing the function of a spacer member.

According to a variant of the invention, at least one of the sheets of the reinforcement comprises a localized aperture for reducing the stiffness of the gasket in the region of this cut-out part.

The sheets of the reinforcement have variable thicknesses and are previously work hardened, provided with lamellar portions and calibrated so as to obtain S-shaped deformations.

According to a particular characteristic of the invention, the packing comprises impressions on at least one of its two faces so as to improve the capacity to receive imprints on the joint planes of the parts in contact.

In a preferred embodiment of the invention, the elastomer has a low dynamic viscosity, being more particularly selected from silicones so as to permit filling the various interstices.

BRIEF DESCRIPTION OF THE DRAWINGS

The invention will now be described in accordance with a particular embodiment with reference to the accompanying drawings, in which.

DETAILED DESCRIPTION

Figure 1:
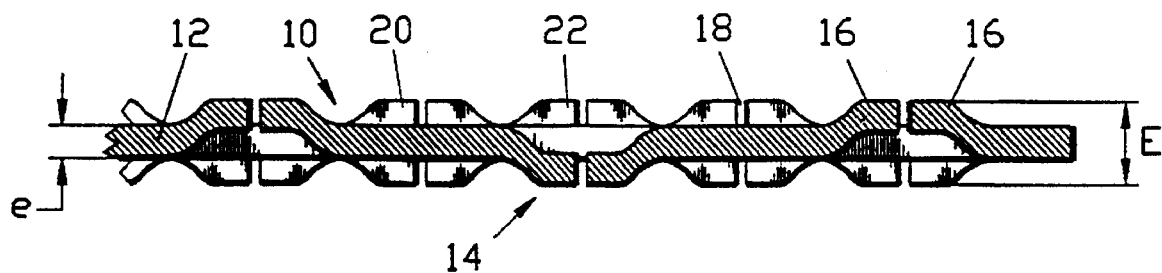
FIG. 1, is a partly sectional view of a sheet provided with lamellar portions for manufacturing a flat gasket according to the invention.

In FIG. 1, the reinforcement 10 comprises a metallic sheet 12 which is provided with lamellar portions 14 each comprising two tongues 16 separated by a gap 18. The tongues have a rectangular shape as viewed from above, only one of the sides remaining connected to the sheet.

They are produced by cutting, followed by bending and calibration. In this way, the S-shaped profile shown in FIG. 1 is obtained.

Each of the tongues of each lamellar portion is in fact a spring in its own right.

The sheet constructed in this way therefore comprises distributed resilient bearing elements which constitute as many return springs.

The lamellar portions project from each side of the sheet and are symmetrical with respect to the median plane of the sheet.

In FIG. 1, the lamellar portions 20 and 22 shown in full lines are lamellar portions which are located behind the first row. These lamellar portions are in fact arranged in a staggered manner.

If e is the initial thickness of the sheet, this thickness becomes a free thickness E subsequent to the provision of the lamellar portions.

Figure 2:
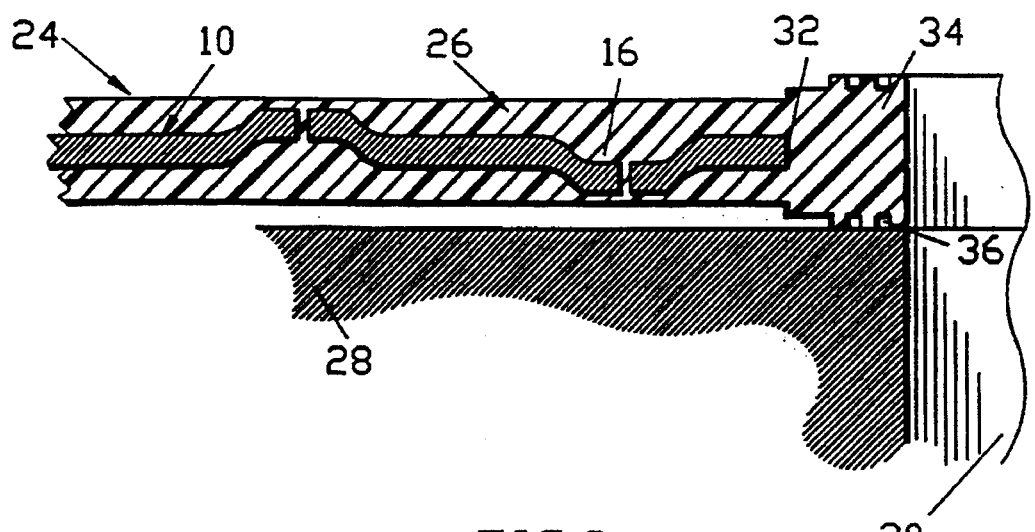
FIG. 2, is a partly sectional view of a flat gasket according to the invention.

Shown in FIG. 2 is the gasket proper 24 which is embedded in a matrix 26 of elastomer. The gasket is mounted on a part 28 and seals the opening 30.

The matrix 26 of elastomer is extended in the region of the end 32 of the sheet by a beading 34 having an extra thickness.

The matrix and the beading are unitary with no discontinuity.

In the known manner, grooves 36 are provided in the beading.

The elastomer employed is preferably selected from the silicones or at least from elastomers having a low dynamic viscosity so that, when it is placed in position and subsequent to creep, the elastomer comes to fill all the interstices.

Figure 3:
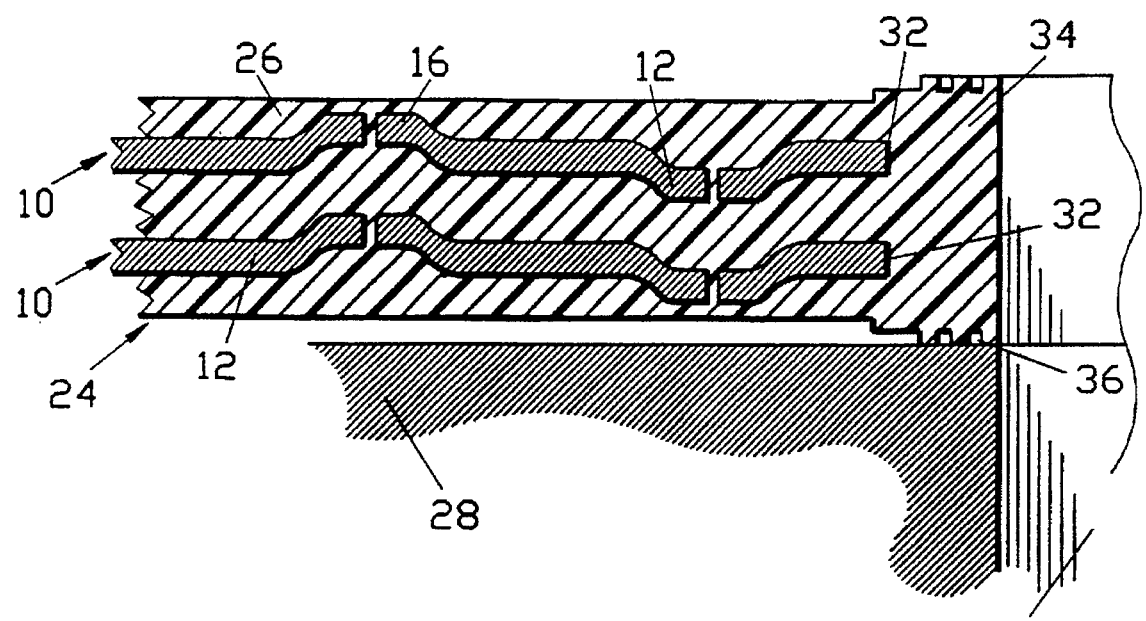
FIG. 3, is a partly sectional view of a flat gasket of the multi-sheet type according to the invention.

In FIG. 3, gasket 24 comprises two superposed metallic sheets 10. The assembly is embedded in a matrix 26 of elastomer as in the embodiment of FIG. 1.

Figure 4:
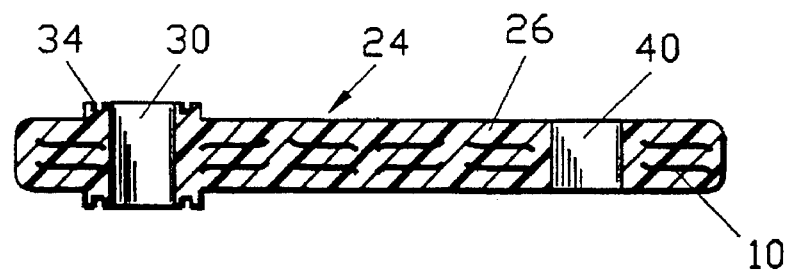
FIG. 4, is a schematic sectional view of a flat gasket according to the invention with the openings for the passage of screws.

In FIG. 4, the gasket comprises two schematically represented superposed metallic sheets, and an opening 40 for the passage of a belt.

The elastomer may include impressions on its surface so as to improve its capacity to receive imprints. In this case, the surface state of the joint planes requires less machining.

Further, the flat gasket constructed according to the invention from a multi-sheet reinforcement results in a good distribution of the forces throughout the area of the gasket.

Not only is the distribution good, but it is possible to vary it locally so as to take into account certain regions subjected to higher pressures. For this purpose, it is sufficient to eliminate a part of one of the sheets making up the reinforcement in the region where it is desired to reduce the pressure.

The flat gasket according to the invention has many advantages.

First of all, the mechanical resistance of the connection of the beadings to the reinforcement is excellent bearing in mind the fact that the beadings are unitary with the elastomeric matrix in that they are molded in one piece therewith.

Further, the flat gasket according to the invention provides a double seal with a maximum leakage path. Indeed, in addition to the seal obtained on the periphery of each opening with the beadings, there is a secondary seal constituted by the layer of elastomer which covers the entire area of the gasket, and, owing to the nature of the material, the seal in the heart of the gasket is excellent.

Such a gasket also resists heat very well, and this allows applications for fluids of high temperature such as those of the oil circuits in internal combustion engines.

Figure 5:
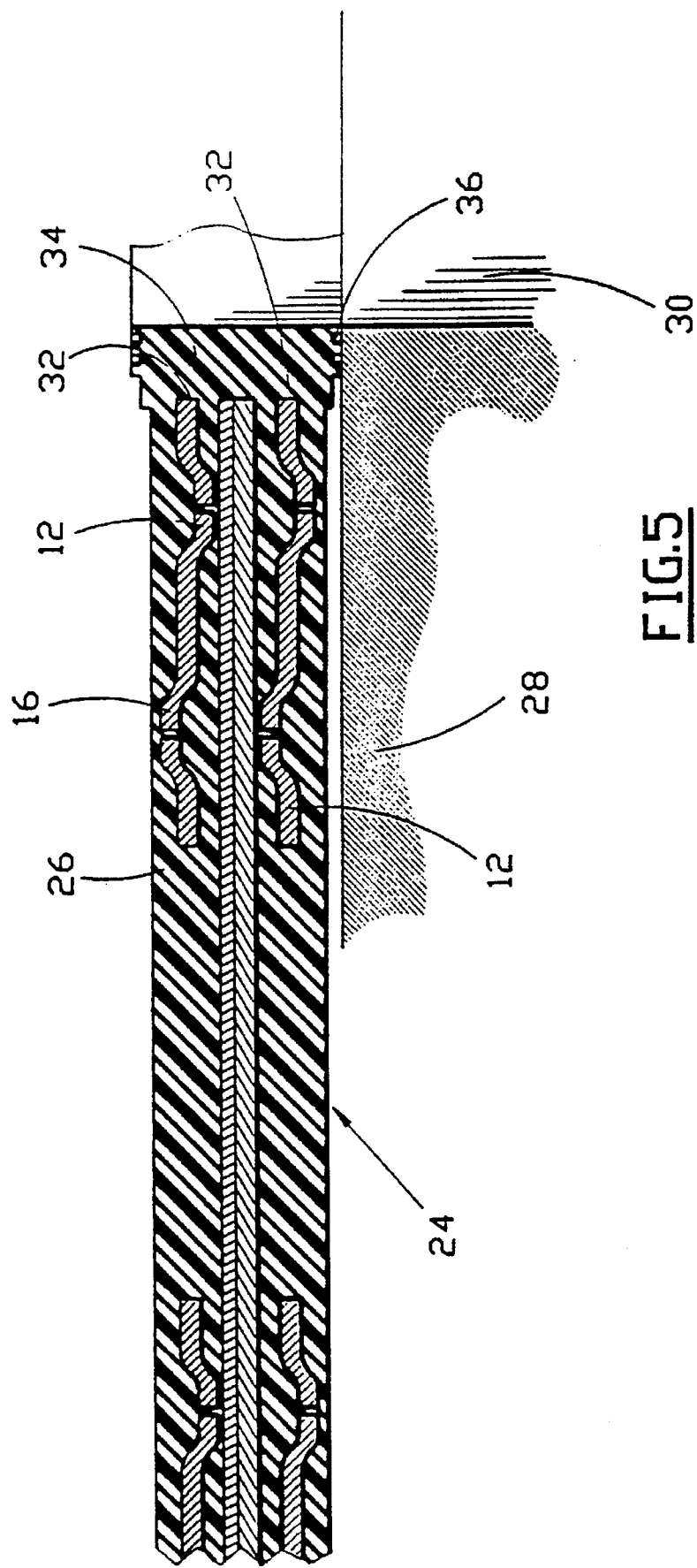
FIG. 5 is a schematic sectional view of a flat gasket according to the invention, comprising two sheets of different thicknesses.

Another advantage of this gasket is that it permits an easy adaptation owing to the possibility of modifying its height. To obtain different heights, it is sufficient to insert between the metallic sheets provided with lamellar portions smooth metallic sheets which perform the function of spacer members. As these sheets may be selected with small variations in thickness, the increments in the increase in height are small, whence a good adaptability (see FIG. 5).

In certain applications, the gaskets of different thicknesses are distinguished by their colors, since the elastomer is mixed with coloring agents in accordance with a previously-determined color code.

The double seal is particularly advantageous for use in drainage plugs, where very precise centering of the gasket on the plug can be ensured by means of one of the sheets of the reinforcement.

We claim:

1. In an assembly comprising a first planar part, a second planar part and clamping means applying clamping loads for tightening one of said planar parts against the other, a flat gasket intercalated between said planar parts, said gasket comprising a reinforcement including at least one metallic sheet combined with a packing constituted by elastomer, said at least one metallic sheet having passage openings to be sealed, said packing comprising portions having an extra thickness and surrounding said passage openings, wherein at least one face of said at least one metallic sheet is provided with distributed resilient load bearing elements extending from said at least one face towards one of said planar parts and terminating in a free branch which is substantially parallel to said one of said planar parts, and wherein said resilient load bearing elements are adapted to take said clamping loads and, upon variation of said clamping loads, to bias said packing toward said one of said planar parts.

2. The gasket according to claim 1, wherein said load bearing elements comprise resilient deformations provided in said metallic sheet and projecting from both sides of said metallic sheet.

3. The gasket according to claim 2, wherein said resilient deformations project symmetrically relative to a median plane of said metallic sheet.

4. The gasket according to claim 1, wherein said reinforcement comprises a stack of superposed sheets, at least one of said sheets of said stack being provided with said distributed resilient bearing elements and at least one other of said sheets of said stack being a smooth sheet devoid of a resilient load bearing element and acting as a spacer member.

5. The gasket according to claim 4, wherein said stack of sheets comprises at least two smooth sheets having different thicknesses.

6. The gasket according to claim 1, wherein said metallic sheet of said reinforcement comprises a localized aperture for reducing a stiffness of said gasket at a location of said aperture.

7. The gasket according to claim 1, wherein said metallic sheet is a previously work-hardened sheet, provided with lamellar portions and calibrated so as to obtain deformations having an S-shaped cross-section.

8. The gasket according to claim 1, wherein at least one face of said packing comprises impressions adapted to receive imprints of said joint planes of said parts in contact with said gasket.

9. The gasket according to claim 1, wherein said elastomer is a silicone adapted to fill interstices provided in said metallic sheet.

* * * * *